United States Patent [19]

Lemke et al.

[11] Patent Number: 5,255,485
[45] Date of Patent: Oct. 26, 1993

[54] APPARATUS AND METHOD FOR INSTALLING ROOFING FASTENERS

[75] Inventors: Lorne R. Lemke; James A. Smith; Stuart H. Lemke, 349 River Bluff, all of Mosinee, Wis. 54455

[73] Assignee: Stuart H. Lemke, Mosinee, Wis.

[21] Appl. No.: 672,353

[22] Filed: Mar. 20, 1991

Related U.S. Application Data

[63] Continuation-in-part of Ser. No. 473,240, Jan. 31, 1990, abandoned, which is a continuation of Ser. No. 385,256, Jul. 25, 1989, Pat. No. 4,987,714, which is a continuation-in-part of Ser. No. 235,542, Aug. 25, 1988, abandoned, and a continuation-in-part of Ser. No. 236,666, Aug. 25, 1988, Pat. No. 4,834,600.

[51] Int. Cl.$^5$ ................................................ E04B 5/00
[52] U.S. Cl. ............................................ 52/410; 7/158; 7/165; 81/52
[58] Field of Search ....................... 52/410, 512; 7/158, 7/165; 81/437, 439, 459, 52, 54, 57.32, 57.36, 57.22

[56] References Cited

U.S. PATENT DOCUMENTS

| 3,965,510 | 6/1976 | Ernst ................................ 7/158 |
| 4,074,501 | 2/1978 | Sandquist . |
| 4,361,997 | 12/1982 | DeCaro . |
| 4,380,413 | 4/1983 | Dewey . |
| 4,455,804 | 6/1984 | Frankovitch . |
| 4,467,581 | 8/1984 | Frankovitch . |
| 4,520,606 | 6/1985 | Frankovitch . |
| 4,545,270 | 10/1985 | Deavey .......................... 52/512 X |
| 4,551,875 | 11/1985 | Getz et al. ..................... 81/437 X |
| 4,616,455 | 10/1986 | Hewison . |
| 4,620,402 | 11/1986 | Beneze . |
| 4,658,558 | 4/1987 | Verble . |
| 4,712,959 | 12/1987 | Hasan . |
| 4,726,164 | 2/1988 | Reinwall et al. . |
| 4,727,699 | 3/1988 | Sargent . |
| 4,757,661 | 7/1988 | Hasan . |
| 4,763,456 | 8/1988 | Giannuzzi . |
| 4,787,188 | 11/1988 | Murphy . |
| 4,860,513 | 8/1989 | Whitman ........................ 52/410 |
| 4,987,714 | 1/1991 | Lemke . |

Primary Examiner—Carl D. Friedman
Assistant Examiner—Creighton Smith
Attorney, Agent, or Firm—Streich Lang

[57] ABSTRACT

The present invention relates to a tool and method for installing a roof fastener for securing insulation or waterproof membrane to a rooftop.

7 Claims, 2 Drawing Sheets

APPARATUS AND METHOD FOR INSTALLING ROOFING FASTENERS

This application is continuation in part of U.S. Ser. No. 07/473,240 filed Jan. 31, 1990 now abandoned, which is a continuation of U.S. Ser. No. 385,256 filed Jul. 25, 1989, issued as U.S. Pat. No. 4,987,714 on Jan. 29, 1991, which is a continuation in part of Ser. No. 235,542 filed Aug. 25, 1988, abandoned and of Ser. No. 236,666, filed Aug. 25, 1988 now U.S. Pat. No. 4,834,600.

FIELD OF THE INVENTION

The present invention relates to a tool and method for installing a roof fastener for securing insulation or waterproof membrane to a rooftop.

BACKGROUND OF THE INVENTION

A variety of screw and plate type fastener systems have been designed for securing successive layers of roof covering materials (e.g., a water impervious membrane overlying a layer of insulation) to rooftops made of steel, gypsum, tectum, or wood. Such systems generally include an elongated screw which penetrates a flat plate (washer). The plate (sometimes referred to as a stress plate) clamps down the roof covering membrane and/or insulation when the screw is tightened in the rooftop and tends to prevent the membrane or insulation from pulling vertically over the head of the screw.

Screw and plate fasteners are most frequently used on commercial buildings having a flat rooftop. In general, a layer of insulation is laid out overlying the roof deck and fastened down with screw and plate fasteners. A sheet of membrane, typically marketed in rolls, is then laid out over the insulation. Fasteners are then installed along the edges of the membrane sheet. The distance from the edge and the distance between fasteners is determined in accordance with the deck and membrane material and anticipated conditions. More specifically, a minimum force which will cause the membrane to tear away from the fastener (or the fastener to pull out of the roof), is prescribed. The number of fasteners per unit linear distance is chosen to ensure that the membrane and/or insulation will be retained.

To install the respective fastener, a pilot hole is, if needed, drilled at the desired location through the roof membrane, insulation, and deck. A plastic or metal screw is placed through a retaining stress plate and then installed in the hole, engaging the roof deck so that the plate is held tightly against the membrane. After the fasteners have been installed along the edge of the first sheet, a successive sheet of membrane is laid out, with one edge overlapping the edge of the first sheet of membrane covering the fasteners. That edge of the successive sheet is bonded (e.g., chemically or by heating) to the preceding sheet. The other edge of the succeeding sheet is fixed to the roof deck by fasteners in the manner previously described. Thus, the roof is covered by overlapping sheets of membrane. The membrane edges along the edges of the roof are fixed by battens or other conventional techniques.

Problems have been encountered with conventional screw and plate fasteners when employed in such rooftop environments. Wind blowing over the membrane tends to create a negative air pressure, which in turn tends to cause the membrane to pull laterally out from the fastener. To mitigate against the membrane tearing out from under the anchor due to such lateral forces, downwardly directed cleats, lugs, spikes, ribs or other protrusions on the underside of the stress plate, engage the membrane when the screw is tightened in the rooftop. See, for example, Murphy U.S. Pat. No. 4,787,188, issued Nov. 29, 1988 and Reinwall et al. U.S. Pat. No. 4,726,164, issued Feb. 23, 1989. However, over time wind vibrations and/or vibrations from within the building cause the screw to back out (unscrew) from the rooftop. These conditions can cause the head of the screw to pop up, i.e., protrude from the surrounding roofing material, which in turn leads to damage to the underlying membrane, insulation and roof.

Back out can be prevented by preventing the screw from turning (in a reverse direction) relative to the roof. This could be accomplished with a broad headed screw having lugs, spikes, ribs or the like on the underside of the head to engage the membrane and prevent counter-rotation. However, rotation of the lugs, etc., during installation would tend to tear or otherwise damage the membrane. Accordingly, fastener systems have been proposed including a plate with anti-rotation structure which engages the membrane, e.g., spikes (which also militate against lateral pull out of the membrane), a separate screw, and a mechanism to prevent counter-rotation of the screw relative to the plate.

Such a system is described in the aforementioned Dewey U.S. Pat. No. 4,380,413. Projecting pawls on the head of a screw cooperate with projections on a plate as a ratchet system to prevent rotation to effect installation but prevent counter-rotation between the plate and screw. Projecting structures on the underside of the plate engage the roofing material to prevent rotation of the plate relative to the roof.

A similar system employing a ratchet mechanism to prevent the screw from backing out is also described in Giannuzzi U.S. Pat. No. 4,763,456, issued Aug. 16, 1988. However, these various ratchet structures tend to give the fastener assembly an undesirably high profile, and may be susceptible to disengagement due to, among other things, failure of the ratchet members, due to, e.g., overtightening or undertightening during installation.

Other such systems employ a threaded connection between the plate and fastener. For example, DeCaro U.S. Pat. No. 4,361,997, issued Oct. 25, 1988 describes a fastener with upper and lower sets of threads with an intervening unthreaded area which cooperates with a stress plate bearing anti-rotation structure on its underside. The lower set of threads are threaded through the plate at the job site with the use of a special tool prior to installation. The upper threads engage the plate after the screw is substantially turned into the roofing deck. The anti-rotation structures engage the roof membrane and prevent the plate from turning.

A number of other mechanical systems have been proposed for preventing separation of the screw from the plate in such fasteners. Systems have been proposed which employ a cap over the head of the fastener (see, e.g., Verble U.S. Pat. No. 4,658,558, issued Apr. 12, 1987; Frankovitch U.S. Pat. No. 4,520,606, issued Jun. 4, 1985; Beneze U.S. Pat. No. 4,620,402, issued Nov. 4, 1986) or resilient spring mechanisms to maintain tension (see, e.g., Hewison U.S. Pat. No. 4,616,455, issued Oct. 14, 1986), or a nut or similar element disposed on the lower end of the screw beneath the rooftop to hold the fastener in place, (see, Sargent U.S. Pat. No. 4,727,699, issued Mar. 1, 1988). Application of a bonding or sealing agent over the head of a fastener, between a stress plate and the membrane, or both, has also been proposed. See, Sandquist U.S. Pat. No. 4,074,501, issued Feb. 21, 1978, and Frankovitch U.S. Pat. Nos. 4,455,804 and 4,467,581, issued Jun. 26, 1984 and Aug. 28, 1984, respectively. These fasteners are only partly effective in preventing the fastener from backing out, and require additional structure for that purpose.

Roofing fastener systems with provisions for preventing the head of the screw from protruding beyond the top of the plate, e.g., in the event of loss of installation tension, have also been proposed. For example, such a system, wherein the washer includes a flexible ring about the aperture that receives the screw, is described in Dewey U.S. Pat. No. 4,380,413 issued Apr. 19, 1983. Another such system employing a plastic washer having a resilient rib which engages the screw head to hold it down is described in Hasan U.S. Pat. Nos. 4,712,959, issued Dec. 15, 1987, and 4,757,661, issued Jul. 19, 1988.

However, all such roofing fasteners, which, in effect, rely on engagement between a stress plate and roofing membrane to prevent backout, are susceptible to a greater or lesser degree to failure due to loss of preload, i.e., compressive force between the fastener and roofing material holding the plate against the membrane. Loss of preload can occur when the underlying insulation deteriorates and shrinks due to, e.g., harsh weather conditions, vibrations, or the like. For example, in some instances, a rocking motion of the stress plate may be caused by wind load or roof traffic tending to collapse the insulation in the vicinity of the stress plate. Likewise, aging, temperature fluctuation, and moisture may also tend to collapse insulation.

When the insulation collapses, the clamping force applied by the stress plate to the membrane and insulation surface decreases from the level at which the fastener was originally installed preload. If the clamping force drops below a certain level, the stress plate ceases to engage the membrane, and concomitantly no longer prevents backout of the screw, or counters pullout of the membrane due to lateral forces.

Perhaps the most widely used roofing anchor is a plastic auger type fastener. In many instances, it is desirable for such a fastener to manifest a particularly aggressive thread pitch. Aggressive thread pitch tends to facilitate installation, and provides for better engagement between the auger fastener and the deck in certain types of deck materials. However, the use of the aggressive thread pitch makes such fastener particularly susceptible to loss of preload due to backout. One revolution of reverse rotation may cause as much as ⅜ inch backout. Thus, if for any reason the auger screw loses engagement with its cooperating stress plate, or, the stress plate loses engagement with the membrane, results can be disastrous.

Fasteners including a screw and a spiked stress plate which form a bond between on outer surface of the screw and an inner surface of the plate during installation are also known. Such fastener is described in U.S. Pat. No. 4,987,714, issued on Jan. 29, 1991 to Stuart Lemke. The screw and plate can be made of commonly available thermoplastic resins, and do not require special structures on the screw or plate to prevent the screw from unscrewing (backing out). The cleats on the bottom of the plate facilitate bonding through spin welding, and also help prevent disengagement of the plate from the membrane or the membrane tearing loose or fluttering.

The bond between the screw and the plate also tends to militate against rocking motion of the stress plate that might collapse the underline insulation. However, engagement between the stress plate and membrane is relied upon to prevent backout. Thus, while considerably more tolerant than other forms of roofing fasteners, the spin welded fastener continues to be susceptible to disfunction in the event that clamping force decreases sufficiently from the preload (installation) level.

A plastic auger type roofing fastener for use in such non-penetrating situations, which includes extendable wire barbs to engage insulation or other roofing material such as tectum is described in U.S. Pat. No. 4,655,659, issued Apr. 7, 1987 to Stuart Lemke. The wires are initially stored in an internal compartment within the screw body underlying a slidable plunger. To extrude the barbs, the plunger is forced downwardly by the ram of an impact type installation tool. Another such fastener is described in U.S. Pat. No. 4,507,991, issued Apr. 2, 1985 to Stuart Lemke, in which the internal chamber is threaded, and the plunger threadedly engaged therein. The plunger is then rotated to effect longitudinal motion to extrude the barbs.

The tools for installing such roofing fasteners are also known. An example is described in the aforementioned U.S. Pat. No. 4,507,991. Installation tools impart rotational motion to the fastener to screw the auger into the deck, then provide either an impact to the plunger within the fastener or a rotational motion to the plunger to cause the barbs to extend. However, such installation tools tend to be complex and expensive. In addition, impact installation tools tend to disrupt the integrity of low density decks, and denigrate the thread engagement between the fastener and decking material. Further, such impact installation tools are unsuitable for use with fasteners in which a bond is formed between screw and stress plate; the impact employed in setting the wire barbs disrupt the bond.

SUMMARY OF THE INVENTION

The present invention provides a method and apparatus for installing barbed roofing fasteners which does not involve expensive or complex mechanisms.

BRIEF DESCRIPTION OF THE DRAWINGS

The invention will be further described with reference to the accompanying drawings, wherein like numerals denote like elements, and.

DETAILED DESCRIPTION OF PREFERRED EXEMPLARY EMBODIMENTS

Figure 1:
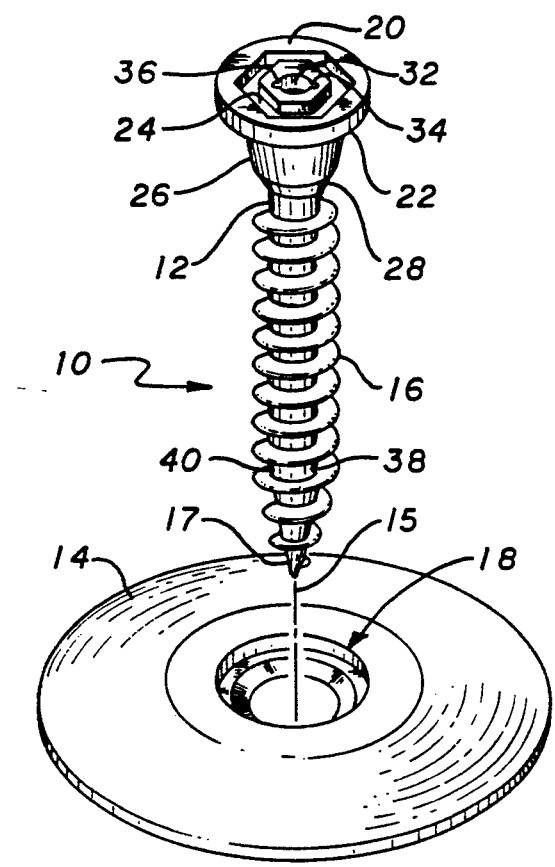
FIG. 1 is a schematic pictorial of a fastener employed in connection with the present invention.
Figure 2:
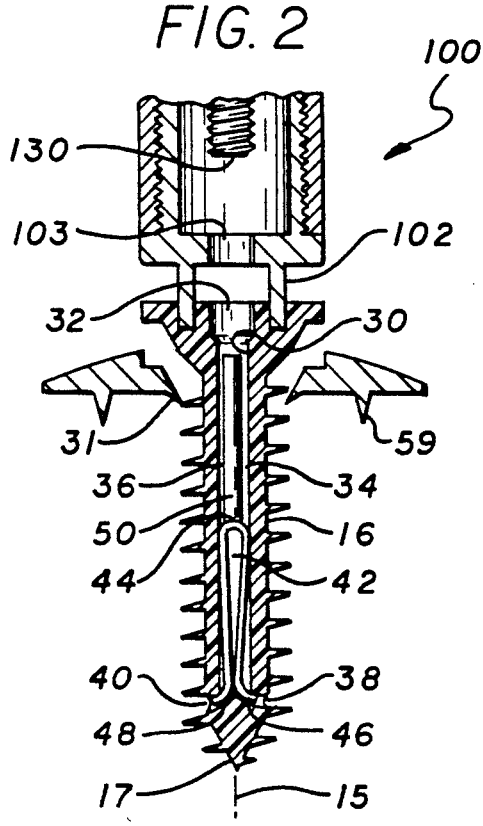
FIG. 2 is a schematic cross-sectional view of fastener in engagement with a tool in accordance with one aspect of the present invention.

Referring now to FIGS. 1 and 2, a fastener assembly 10 includes a plastic screw 12 and a cooperating stress reliever 14, suitably a disk-shaped stress plate, designed for use with a roof fastener to spread stress on the underlying roof structure over a board area.

Screw 12 has an elongated body 16 symmetrical about a longitudinal axis 15, configured for insertion through a central hole 18 in stress reliever 14. Body 16 is suitably at least partially threaded, preferably with an aggressive pitch external thread and terminates at one end in a tapered point 17 suitable for boring through relative soft roof materials such as a structural cement wood fiber, e.g., tectum deck. The thread height of threaded body 16 is preferably at least about ⅛ inch (about 0.32 cm), particularly ⅛ to ¼ inch (0.32-0.64 cm) to obtain suitable holding strength in terminates in a head 20, which suitably comprises a peripheral flange 22; a polygonal, e.g., hexagonal, recess 24 in its flat end surface, entered about axis 15; a welding surface 26; and a shoulder 28. As will hereinafter be more fully explained, polygonal recess 24 is configured to engage a mating head 102 on an installation tool 100. Welding surface 26, suitably slightly frustoconical and disposed intermediate flange 22 and shoulder 28, serves as a primary surface for spin welding or adhesion. Welding surface 26 may, alternatively, be cylindrical. Shoulder 28 is suitably frustoconical, tapering outwardly from body 16 at an angle of at least about 30 degrees. Shoulder 26 aids in centering screw 12 in hole 18.

Figure 3:
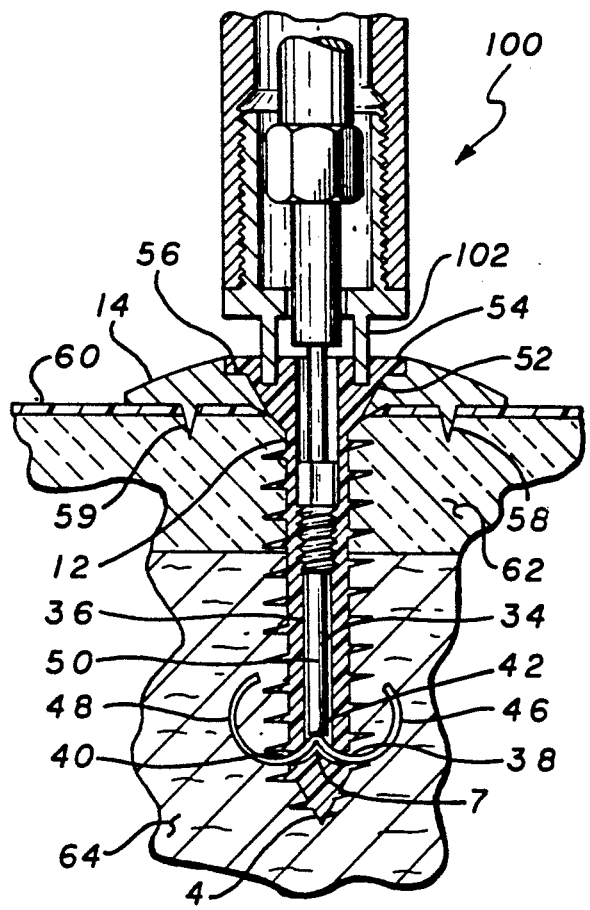
FIG. 3 is a schematic cross-sectional view of a fastener in engagement with a tool in accordance with the present invention, with the tool in an extended position.

As best seen in FIGS. 2 and 3, body 16 includes an internal cylindrical channel 30 of predetermined diameter centered upon axis 15, communicating with a concentric counterbore 32 of a second predetermined diameter, greater than that of channel 30, disposed interiorly of polygonal recess 24. Respective small diameter side channels 34 and 36 are formed in the sides of channel 30 at 180° from each other. Side channels 34 and 36 communicate at one end with counterbore 32, and at the other ends with openings 38 and 40, respectively, formed in the side walls of body 16.

An extensible mechanism, actuable through channel 30, for engaging the decking material after screw 12 is turned into the decking material is provided; e.g. a U-shaped wire member 42 is disposed for longitudinal movement within channels 30, 34 and 36. The sides of wire member 42 are received in channels 34 and 36. Wire 44 is suitably of a diameter corresponding to the diameter of channels 34 and 36 and is configured to include a base portion 44 and respective feet 46 and 48. Feet 46 and 48 are, in assembly, disposed in the vicinity of side wall openings 38 and 40. A plunger 50 is disposed for longitudinal movement in channel 30. If desired, plunger 50 can include side members conforming to side channels 34 and 36.

Stress reliever 14 is preferably a round plate, although other shapes may be employed. For purposes of the present invention, the term "stress reliever" includes disks, plates, battens, elongated strips secured by multiple fasteners, and similar devices. Hole 18 is round in cross section and extends completely through plate 14 at its center, suitably including a slightly frustoconical lower end 52 and a cylindrical upper end (counterbore) 54 of larger diameter which together define a generally horizontal step 56 (see FIG. 3). Upper end 54 of hole 18 defines a recess which is large enough so that flange 22 fits mostly or entirely therein, whereby the underside of flange 22 engages step 56. Specifically, the diameter of upper end 54 is slightly greater than the diameter of screw flange 22, to accommodate a minor misalignment in inserting screw 12. Similarly, lower frustoconical end (surface) 52 of hold 18 is geometrically similar to welding surface 26 of screw 12, so that surface 26 fits closely therein. Lower end 52 of hole 18 is preferably slightly smaller in overall diameter than welding surface 26 so that a slight interference fit is obtained upon complete insertion of screw 12 into hole 18. This interference fit promotes friction during installation to, e.g., induce spin-welding. Specifically, the relative diameter of welding surface 26 and lower end 52 of hold 18 (i.e., the interference fit) are preferably chosen to ensure a minimum pressure of surface 26 against surface 52. This tends to lessen the sensitivity of the weld to variations in downward pressure by the operator. This is particularly true where surfaces 26 and 52 are cylindrical in shape. Thus, for the foregoing purposes, it is generally preferred that lower end 52 of hole 18 have an overall diameter from about 0 to 0.01 inch (0-0.025 cm) than the corresponding diameter of welding surface 26 of screw 12.

Referring to FIGS. 2 and 3, the underside of plate 14 may, if desired, include a central frustoconical projection 58 centered on hole 18 to provide a surface to coact with shoulder 26 of screw 12. In practice, however, projection 58 about the periphery of hole 18 is typically omitted, and screw shoulder 28 extends beyond the bottom surface of plate 14. A plurality of cleats (spikes) 59 disposed in an array about hole 18, extend from the underside of plate 14.

When installed, as shown in FIG. 3, screw 12 is received through hole 18 of stress plate 14 and extends through and into successive layers of roofing materials such as a waterproof membrane 60, e.g., rubberized fabric, a layer of thermal insulation 62 and a roof deck 64, formed of, for example, tectum. Feet 46 and 48 of wire member 42 are extruded outward through opening 40 by longitudinal movement of plunger 50, as will be explained. A fastener combining a spin weld barbed plate, and extensible barbs is particularly advantageous in a number of respects. In particular, such a fastener is securely locked both into membrane 60 and decking material 64. The solid bond between screw 12 and plate 14 in combination with the backout preventing wire legs 46 and 48, not only tends to prevent rocking of the plate due to wind or roof traffic, but also makes the fastener considerably more tolerant of insulation collapse.

Figure 6:
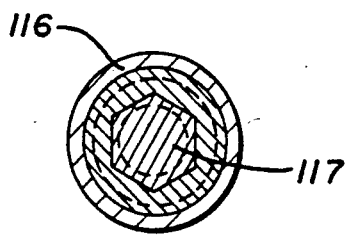
FIG. 6 is a top plan view of a polygonal bushing employed in the tool of FIGS. 4 and 5.
Figure 4:
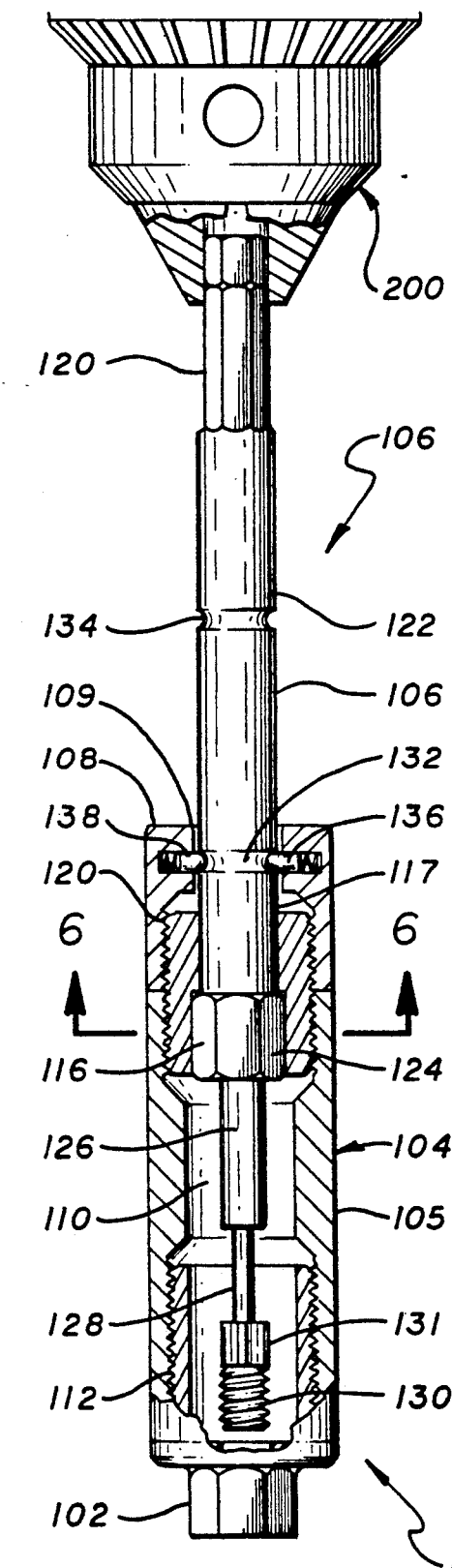
FIG. 4 is a schematic partial cutaway cross-sectional view of a installation tool in accordance with one aspect of the present invention, in a retracted position.
Figure 5:
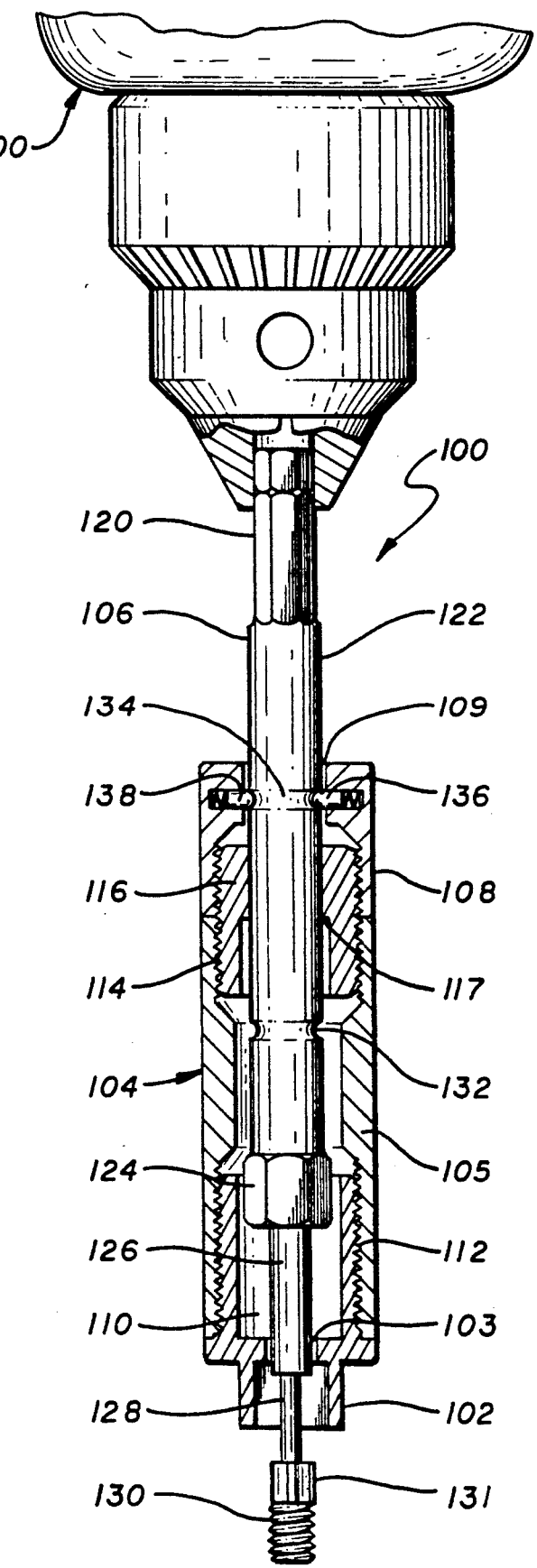
FIG. 5 is a schematic cross-sectional view of the tool of FIG. 4 in an extended position.

Installation of fastener 10 is effected, in accordance with one aspect of the present invention, with installation tool 100. Referring now to FIGS. 4–6, tool 100 comprises a casing 104, and a drive shaft 106. Casing 104 suitably comprises a polygonal head 102, a tubular body 105, and a cap 108.

Polygonal head 102 conforms in configuration to recess 24 (FIGS. 1–3) of screw head 20, and is adapted to be engaged therewith. When engaged head 102 is solidly seated in recess 24, an not only effects rotation of screw 12 with head 102, but also mounts coaxial alignment between screw 12 and shaft 106. Head 102 is suitably in the form of a bushing threadedly mounted to one end of casing body 105. Head bushing 102 includes a central bore therethrough of sufficient dimensions to pass the end portion of drive shaft 106, as will be explained.

Casing body 105 is suitably cylindrical, with an internal chamber 110. Respective end portions 112 and 114 of chamber 110 are threaded, adapted to receive at end 112 polygonal head 102, and at end 114, a bushing 116 including an interior polygonal (e.g., hex) internal passage, e.g., a ⅜ inch hex bushing. The upper portion of bushing 116 suitably includes exterior threads 120 for receiving cap 108.

Drive shaft 106 couples installation tool 100 to, e.g., an electric drill, or other rotary device and is employed to actuate (extend) wire 42. Shaft 106 suitably includes a plurality of contiguous sections 120-128: an end portion 120 suitable for engagement by a standard drill chuck, e.g., ¼ inch hex; relatively large diameter round shaft portion 122, e.g., a ⅜ inch round; a polygonal (e.g., hex) section 124 conforming in cross section to the passage configuration of bushing 116; an intermediate diameter section 126 approximately ¼ inch round, and a small diameter section 128, e.g., a round of slightly smaller than ¼ inch diameter, with a threaded tip 130 formed at the end thereof. Respective ring detents 132 and 134 are formed in round portion 122 at predetermined distances, axially from the upper edge 134 of polygonal section 124. The distance between ring detents 132 and 134 generally corresponds to, as will be explained, the travel required to extend legs to end 48 of wire member 42.

Threaded tip 130 suitably is of a diameter slightly larger than the diameter of channel 30 of screw 2, and less than the diameter of counterbore 32 and manifests a relatively coarse, aggressive thread, e.g., ¼ inch by 0.250.

Cap 108, suitably threadedly fastened to external threads on hex bushing 116 and coaxial with casing 108, is preferably tubular with a cylindrical internal chamber 109. A pair of spring loaded pins 136 and 138 are disposed in the side walls of cap 108 extending inwardly a predetermined distance from the top of bushing 116. Pins 136 and 138 suitably terminate in rounded portions, and cooperate with the curved surface of ring detents 132 in such a manner that axial force beyond a predetermined threshold (greater than the downward pressure typically exerted in installation of screw 12) Causes pins 136 and 138 to ride up on the curve, and become dislodged from the detents.

Alternatively, cap 108 can comprise a commercially available ball and retaining sleeve such as a Mitton 728 air line coupling. If such a ball and retaining sleeve is employed for cap 108, the retaining sleeve is moved axially to permit the balls to disengage from detent 132 or 134.

Referring to FIGS. 4 and 5, drive shaft 106 is received through chamber 109 of cap 108, passageway 117 of bushing 116, and chamber 110 of casing body 105. Shaft 106 is adapted for axial movement relative to casing 104 between retracted (FIG. 4) and extended (FIG. 5) positions.

In the retracted position, pins 136 and 138 are received in ring notch 132, and polygonal portion 124 of drive shaft 106 is seated Within passage 117 of bushing 116 so that polygonal portion 124 and bushing 117 cooperate as a gear. Thus, in the retracted position, rotational motion imparted to drive shaft 106 by drill 200 is concomitantly imparted to casing 104, and in particular, to head 102.

In the extended position, pins 136 and 138 are lodged in ring detent 134, large diameter round portion 122 of drive shaft 106 extends through bushing 116, with hex portion 124 forward of bushing 116 and disengaged therefrom, ad tip 130 extends through bore 103 of head 102, exteriorly of head 102. With polygonal section 124 unseated from bushing 116, casing 104 is effectively rotationally decoupled from casing 104, while at the same time maintained in coaxial alignment. Thus, shaft 106 rotates independently of casing 104.

In operation, end portion 120 is engaged in the chuck of, e.g., a conventional reversible drill, schematically indicated as 200. Head 102 is firmly seated in recess 24 of screw head 20, with shaft 106 in the retracted position. A plate 14 is disposed on membrane 60, spike side down. The tip 17 of screw 20 is disposed overlying membrane 60 at the center of hole 18. Drill 200 is then actuated to impart rotational motion to drive shaft 106, and in the retracted position, hence, casing 104 and head 102.

Once screw 20 is completely turned into the deck, and, preferably, a spin weld effected between screw 12 and plate 14, casing 104 is decoupled from shaft 106; the operator exerts an increased downward force on shaft 116 to dislodge pins 136 and 138 from ring notch 132 and unseat hex portion 124 from bushing 116. Once polygonal portion 124 is decoupled from bushing 116, shaft 106 rotates independently of casing 104 and head 102; rotational motion of casing 104 and head 102 ceases.

As welding surface 26 comes into frictional contact with the surface of lower end 52 of hold 18, heat is generated to melt plastic on one or both of the inner surface of hold 18 and welding surface 26. Friction welding may also occur at the same time between flange 22 and step 56 i.e., spin welding may be conducted on horizontal and vertical surfaces. At the same time, spikes 59 engage membrane 60 so that plate 14 does not substantially rotate relative to screw 12. Spikes 59 thereby serve dual functions of securing the plate during spin welding and securing membrane 60 beneath plate 14 after installation is completed (see FIG. 3).

Screw 12 and plate 14 are preferably configured so that heat generation (and, thus, spin welding) occurs only during the last segment of the insertion of screw 12. Thereafter, rotation of screw 12 is abruptly stopped so that a secure weld will form. The height of spikes 59 affects the length of the final segment of rotation, i.e., the number of rotations of screw 12 that will occur before screw 12 is completely installed. Spikes 59 having a lengths of at least ⅛ inch, especially in the range of about ⅛ to ½ inch (about 0.3-1.3 cm) are generally sufficient for this purpose. In general, the screw and plate are preferably configured so that at least one complete revolution of screw 12 occurs during the final segment of installation as spikes 59 engage membrane 60.

Further downward pressure on shaft 106 causes shaft 106 to move axially relative to casing 102 (motion of casing 102 is arrested by head 20 of screw 12). Since casing 104 is rotationally decoupled from shaft 106, it can remain in engagement with recess 24, and maintain alignment of shaft 106 with channel 30. As shown in FIG. 2, threaded tip 130 ultimately extends through bore 102 of polygonal head 102, and is received in counterbore 32 of head 20. The relative lengths of sections 124, 126 and 128 are chosen such that section 124 is fully decoupled from bushing 116 prior to tip 130 engaging screw 12. In some instances, it may be desirable to omit counterbore 32 from head 20. In such instances, the forward threads of tip 130 engage channel 30. Once the threads of tip 130 have engaged screw 12, rotation of shaft 106 causes tip 130 to tap channel 30; tip 130 screws into and proceeds to travel axially downward in channel 30. As shaft 106 is screwed into channel 30, plunger 50 is forced downward, to in turn, force legs 46 and 48 of wire member 42 to extend outwardly through openings 38 and 40 to engage deck material 64. Since the motion of shaft 106 is smooth and continuous, legs 46 and 48 engage decking 54 with a minimum of disruption. If desired, openings 38 and 40 can be provided with a surface for causing a frictional drag on legs 46 and 48 to cause curling as the legs exit the opening. Such a surface is described in the aforementioned U.S. Pat. No. 4,655,659.

A mechanism is suitably provided to arrest further downward motion of shaft 106 when shaft 106 has travelled a predetermined axial distance corresponding to the travel necessary to effect complete extension of legs 46 and 48. As illustrated in FIGS. 4 and 5, ring detent 134 is disposed such that pins 136 and 138 engage ring detent 134 at such point. Absent application of extraordinary downward force, downward motion of shaft 106 is thus arrested. Alternatively, intermediate shaft 126 can be of a diameter greater than that of channel 30 (or of bore 103), and downward motion of shaft 106 arrested when the step between sections 126 and 128 engages screw head 20 (or head 102). In each case axial motion is arrested, but continued rotation permitted.

Stripping blades 131 are preferably provided to facilitate removal of tool 100 from fastener 10 after installation. Stripping blades 131 follow threaded tip 130 down channel 30 of screw 12, effectively stripping out the newly formed threads and effectively enlarging the channel to approximately the diameter of the periphery of tip 130.

Once downward motion of shaft 106 is arrested, further rotation of tip 130 tends to strip out the threads newly formed in channel 30 of screw 12. Thus, if stripping blades 131 are included, shaft 106 is readily extracted from screw 12 simply by pulling upward; reverse rotation is not necessary.

It should be appreciated that tool 100 is particularly advantageous for use in installing fastener 12. Tool 100 is of simple and inexpensive construction and adapts conventional electric drills or other rotary devices for installation of fastener 12. Further, where stripper blades 131 are included, the necessity of using a reversible rotary device is avoided. Tool 100, by effecting extension of wires 42 without impact also facilitates installation of screw 12 without disrupting the integrity of a spinweld bond between screw 12 and plate 14, decking materials 60, 62, and 64, or the engagement of the screw threads with the decking material. The progression of the shaft 106 through channel 30 is smooth and continuous, so that ejection wire legs 46 and 48 is likewise smooth and continuous, and extend into decking material 64 with a minimum of disruption. Further, extension of shaft 106, and thus actuation of wire 42, may be effected without requiring removal of head 102 from recess 24 of screwhead 20. Thus, alignment of shaft 106 with screw 12 is assured by the engagement of head 102 and recess 24.

In addition, the slight frictional drag entailed in removing tool 100 from fastener 10 after installation is maintained at a minimal value; the frictional drag is not sufficient to disrupt the engagement of screw 12 with decking materials 60, 62 and 64, but is sufficient to test whether screw 12 has properly engaged the decking material 64.

It will be understood that the above description is of preferred exemplary embodiments of the present invention, and the invention is not limited to the specific form shown. For example, while the use of a polygonal shaft section and bushing are particularly advantageous, and preferred, other forms of releasable couplings or clutch mechanisms between outer casing 105 and drive shaft 106 can be employed. Likewise, while a spin weld between screw 12 and plate 14 is particularly advantageous and preferable, the present invention contemplates the use of tool 100 with fasteners in connection with which no spin weld is effected. If desired, a spring (not shown) can also be provided in chamber 110, disposed about sections 126 and 128, for compression between the base plate of head 102 and the step between polygonal portion 128 and intermediate diameter shaft portion 126. Such a spring can be utilized to bias shaft 106 to the retracted position. Further, in some instances, plunger 50 may be omitted from screw 12, and shaft 106 may operate directly on the extension mechanism, e.g. wire 42. Likewise, extensible mechanisms other than wire 42 can be utilized. These and other modifications may be made in design and arrangement of the elements within the scope of the invention as expressed in the claims.

We claim:

1. An apparatus for installing a roofing fastener in a roof deck, said roofing fastener including a screw having a head and a threaded body, said body including an axial internal channel communicating with an opening in said head and at least one opening in the side wall of said body communicating with said internal channel and a mechanism for engaging said roof deck after threaded engagement of said screw and deck in response to an axial force applied thereto, said apparatus comprising:
    a casing, said casing including an internal chamber and a casing head for engaging said screw;
    a drive shaft disposed within said casing internal chamber for slidable motion between a retracted position and an extended position wherein said drive shaft includes a threaded tip and at least one thread stripper disposed above said threaded tip to facilitate removal of said shaft from said screw internal channel; and
    means for selectively rotationally coupling and decoupling said casing and said shaft.

2. An apparatus for installing a roofing fastener in a roof deck, said roofing fastener including a screw having a head and a threaded body, said body including an axial internal channel communicating with an opening in said head and at least one opening in the side wall of said body communicating with said internal channel and a mechanism for engaging said roof deck after threaded engagement of said screw and deck in response to a axial force applied thereto, said apparatus comprising:
    a casing, said casing including an internal chamber and a casing head for engaging said screw, wherein said casing internal chamber includes a passage of polygonal configuration;
    a drive shaft disposed within said casing internal chamber for slidable motion between a retracted position and an extended position, wherein said drive shaft includes first, second and third sections, said first section being nonengagingly receivable through said passage, said second section conforming in cross section to said passage configuration, and said third section including a threaded tip at the end thereof;
    said drive shaft being disposed for axial movement relative to said casing between a retracted position and an extended position, such that when said shaft is in said retracted position said shaft second section is engagingly received in said casing passage such that rotation of said shaft is transmitted to said casing, and such that when said shaft is in said extended position said shaft second section is disengaged from said casing passage to rotationally decouple said shaft from said casing and said shaft threaded tip extends exteriorly of said casing head; and means for selectively rotationally coupling and decoupling said casing and said shaft.

3. The apparatus of claim 2 further including means for releasably maintaining said shaft in said retracted position, such that said shaft is released from said retracted position in response to an axial force on serial shaft relative to serial casing in excess of a predetermined threshold value.

4. An apparatus for installing a fastener, said fastener including a head and a threaded body, said body including an axial internal channel communicating with an opening in said head and an engagement mechanism actuable through said channel, said apparatus comprising:

a casing;

a casing head, rotationally coupled to said casing, configured for engaging said fastener head;

a drive shaft journaled through said casing, releasably coupled to said casing to selectively impart rotary motion to said casing, said drive shaft being rotationally decoupled from said casing by application of axial force to said shaft relative to said casing in excess of a predetermined value, wherein said drive shaft includes a threaded tip and at least one threaded stripper disposed above said threaded tip to facilitate removal of said shaft from said fastener axial internal channel.

5. An apparatus for installing a fastener, said fastener including a head and a threaded body, said body including an axial internal channel communicating with an opening in said head and an engagement mechanism actuable through said channel, said apparatus comprising:

a casing including an axial passage of polygonal configuration;

a casing head, rotationally coupled to said casing, configured for engaging said fastener head;

a drive shaft journaled through said casing, releasably coupled in said casing to selectively impart rotary motion to said casing, said drive shaft being rotationally decoupled from said casing by application of axial force to said shaft relative to said casing in excess of a predetermined value; said drive shaft including first, second and third sections, said first section being nonengagingly receivable through said passage, said second section conforming in cross section to said axial passage configuration, and said third section including a threaded tip at the end thereof; wherein said drive shaft is disposed for axial movement relative to said casing between a retracted position and an extended position, such that when said shaft is in said retracted position said shaft second section is engagingly received in said casing passage such that rotation of said shaft is transmitted to said casing, and such that when said shaft is in said extended position said shaft second section is disengaged from said casing passage to rotationally decouple said shaft from said casing and said shaft threaded tip extends exteriorly of said casing head.

6. An installation tool for use with a hand held rotary device, said tool comprising:

a casing terminating in a head, said head having a peripheral cross-section of a predetermined configuration;

a drive shaft, journaled through said casing, the proximal end of said shaft being configured for coupling to said rotary device wherein said drive shaft distal end terminates in a threaded tip and said drive shaft includes at least one thread stripper disposed above said threaded tip; and means for releasably coupling said shaft to said casing to selectively impart rotary motion to said casing, rotationally decoupling said drive shaft from said casing in response to application of axial force on said shaft relative to said casing in excess of a predetermined value;

wherein said drive shaft is disposed for axial movement relative to said casing between a retracted position and an extended position, such that when said shaft is in said retracted position the distal end of said shaft is within the interior of said casing and rotation of said shaft is transmitted to said casing, and when said shaft is in said extended position said casing is rotationally decoupled from said shaft and said shaft distal end extends exteriorly of said casing head.

7. An apparatus for installing a fastener, said fastener including a head and a threaded body, said body including an axial internal channel communicating with an opening in said head and an engagement mechanism actuable through said channel, said apparatus comprising:

a casing;

a casing head, rotationally coupled to said casing, configured for engaging said fastener head;

a drive shaft journaled through said casing, releasably coupled to said casing to selectively impart rotary motion to said casing, said drive shaft being rotationally decoupled from said casing by application of axial force to said shaft relative to said casing in excess of a predetermined value and including means for coupling said apparatus to a rotary device and for actuating said fastener engagement mechanism through said channel;

wherein said means for releasably coupling said shaft to said casing comprises:

an axial passage of polygonal configuration formed in said casing; and a section conforming in cross section to said passage configuration, formed in said shaft intermediate of said proximal and distal ends disposed such that when said shaft is in said retracted position said shaft second section is engagingly received in said casing passage to transmit rotation of said shaft to said casing, and when said shaft is in said extended position said shaft polygonal section is disengaged from said casing passage to rotationally decouple said shaft from said casing; and means for releasably maintaining said shaft in said retracted position, such that said shaft is released from said retracted position in response to an axial force in excess of a predetermined threshold value.

* * * * *